United States Patent [19]

Wood

[11] Patent Number: 5,055,097
[45] Date of Patent: Oct. 8, 1991

[54] ROTARY DIFFERENTIAL DRIVE

[76] Inventor: Samuel R. Wood, 3 Raymond Avenue, Warrawee, New South Wales, Australia, 2074

[21] Appl. No.: 413,879

[22] Filed: Sep. 28, 1989

[51] Int. Cl.⁵ .............................................. F16H 57/10
[52] U.S. Cl. ...................... 475/271; 475/5; 475/16; 475/269; 475/296
[58] Field of Search .................. 475/1, 5, 14, 16, 149, 475/150, 166, 189, 170, 171, 173, 183, 185, 269, 271, 275, 294, 296

[56] References Cited

U.S. PATENT DOCUMENTS

| | | | |
|---|---|---|---|
| 1,774,831 | 9/1930 | Henin | 475/5 |
| 2,330,397 | 9/1943 | Trofimov | 475/149 |
| 2,436,936 | 3/1948 | Page | 318/8 |
| 2,546,869 | 10/1948 | Przybylski | 475/1 |
| 2,578,837 | 12/1951 | Raney | 310/112 |
| 3,468,191 | 9/1969 | Crook | 475/1 |
| 4,233,858 | 11/1980 | Rowlett | 475/5 |

FOREIGN PATENT DOCUMENTS

| | | |
|---|---|---|
| 828187 | 1/1952 | Fed. Rep. of Germany . |
| 347690 | 7/1960 | Switzerland . |
| 2152604 | 8/1985 | United Kingdom ............ 475/1 |

Primary Examiner—Allan D. Herrmann
Assistant Examiner—Ryan W. Massey
Attorney, Agent, or Firm—Edwin D. Schindler

[57] ABSTRACT

An electro-mechanical rotary drive providing by electrical switching an output shaft speed change by substantially equal small steps. The drive includes an epicyclic differential transmission, with two or more members coupled individually to constant speed a.c. motor(s) all driving through a simple externally power transmitting member which has a base speed or speeds attributable to each coupled member, and an actual speed having combinations of its base speeds for forward, reverse, and zero speed operation of the coupled members.

12 Claims, 4 Drawing Sheets

PREFERRED BASE SPEED NUMBERS

| Series | Constrainable Members | | | | | Total Speeds | Outline Fig. |
|---|---|---|---|---|---|---|---|
| | 1 | 2 | 3 | 4 | 5 | | |
| 1 | 1 | 3 | 5:9 | | | 9:13 | 5,6 |
| 2 | 1 | 3 | 9 | 14:27 | | 27:40 | 7,8 |
| 3 | 1 | 3 | 9 | 27 | 41:81 | 81:121 | 9,10 |
| 4 | 1 | 2 | 5 | 8:15 | | 15:22 | 5,6 |
| 5 | 1 | 2 | 5 | 15 | 23:45 | 45:67 | 7,8 |
| 6 | 1 | 2 | 5 | 15 | 45 | 68:135 135:202 | 9,10 |
| 7 | 1 | 2 | 5 10 | 13:25 | | 25:37 | 5,6 |
| 8 | 1 | 2 | 5 10 | 25 | 38:75 | 75:112 | 7,8 |
| 9 | 1 | 2 | 5 10 | 25 | 75 | 113:225 225:337 | 9,10 |
| 10 | 1 | 2 | 5 10 | 25 50 | | 62 | 5,6 |
| 11 | 1 | 2 | 5 10 | 25 50 | 63:125 | 125:187 | 7,8 |
| 12 | 1 | 2 | 5 10 | 25 50 | 125 | 188:375 375:562 | 9,10 |
| 13 | 1 2 | 3 | 7 14 | | | 17 | 11,12 |
| 14 | 1 2 | 3 | 7 14 | 18:35 | | 35:52 | 13,14 |
| 15 | 1 2 | 3 | 7 14 | 35 | 53:105 | 105:157 | 15,16 |

ROTARY DIFFERENTIAL DRIVE

This invention is an electro-mechanical rotary drive to provide speed change in industrial machinery in substantially equal small steps by electrical switching. It has application in the common situation where electrical power supplied at fixed frequency needs to be utilized as mechanical power at changing speeds.

Many forms of electrically powered drive have been used for this purpose, dating back about a century. Latterly the trend has been to change the fixed frequency a.c. to d.c. by static converter in order to use either a d.c. motor for speed variation, or by the so called process of inversion to use the converted fixed frequency to synthesize an alternating supply at variable frequency to vary the speed of an a.c. motor. These two drives and their many associated refinements supersede such earlier forms as basic Ward-Leonard, induction motor slip power recovery, a.c. commutator motors such as Schrage, and excitation controlled induction couplings. They have also taken prior place in applications which have used one or other of the numerous forms of mechanical variator, now disadvantaged in not lending themselves readily to NC. or CNC. The switched reluctance motor, again requiring conversion of the supply for operation at variable speed, is a recent addition.

In all the drives referred to above the emphasis is on stepless speed variation, widely promoted as indispensable, perhaps due to the circumstance that the known drives operating to change speed in steps were based on gearing in which change is effected by selecting one or other of several available ratios or channels, giving relatively large steps.

As distinct from the widely used current types mentioned above, the drives of this invention do not require conversion of the supply, using a small number of motors which may be switched selectively to change speed, and when energized run at constant voltage and frequency, and constant or substantially constant speed. The motors drive through a transmission employing one or more epicyclic differential assemblies, enabling the output of each and every motor to be channelled through a single member for transmission externally. Each differential assembly has three transmitting members, and when two or more assemblies are coupled, whether in line, by belt, chain or gear, or through another differential assembly, there is a net increase of one member for each added assembly, the number of transmitting members exceeding by two the number of differential assemblies. Of this number of transmitting members all but one are coupled, usually by belt, to suitable motors or other drive(s) which when energized determine the rotational speed or speeds of each, i.e. apply rotational speed constraints to them. As well as the rotational constraints it is essential for the constrainable members, with one exception in certain cases, to have electrically controlled braking in order that each may also be constrained at zero or substantially zero speed. The one transmitting member not constrainable termed here the dependent member, has at least one speed attributable to each constrainable member taken alone, determined by the drive ratio and the speed(s) of the constrainable member. The actual speed of the dependent member is the net sum, taking account of direction, of the speed or speeds contributed to it by the respective constrainable members.

The speeds available at the dependent member are in a series in which each speed is at a substantially equal interval from the next. The series may begin at zero or other predetermined minimum, and any speed may be directly selected, or the series traversed taking each in turn. The number of distinct speeds available is a function of the number of constrainable transmitting members and the number of constraints at each. For each series the speed ratios between the constrainable members and the dependent member must be derived systematically and co-ordinated with the speeds of the motors. The speed of the dependent member due to each speed of each constrainable member taken alone is referred to here as a base speed. Each speed series consists of available combinations of the base speeds for forward, reverse and zero speed operation of the constrainable members resulting in unidirectional rotation of the dependent member. The manner in which the base speeds are determined is described below, as also are the alternative speed series usable according to the purpose for which the drive is intended, the speed range, number of speeds, power requirement and type of duty.

In order to apply the rotational speed constraints the motor or other drive coupled to a constrainable member must be reversible and regenerative. A motor coupled to a constrainable member producing or adding to forward rotation of the dependent member is motoring, and therefore drawing power from the supply, whereas a motor coupled to a constrainable member rotating in the direction to reduce the speed of the dependent member is regenerating, i.e. drawing power from the reaction torque arising within the epicyclic differential(s), and returning it to the supply.

In the preferred cases using constant or substantially constant speed motors, choice of motor type rests between a.c. induction and a.c. synchronous motors, the difference being in the inherent speed regulation under load. As is well known, induction motors are subject to a slip of roughly 5 to 6 per cent in small powers and 3 to 4 percent in higher powers. For many uses this is acceptable and consideration of cost, availability and standard dimensions favour induction motors. If low inherent speed regulation under load is a dominant consideration synchronous motors best satisfy the conditions. Provided the requirements as to reversibility, regeneration and braking are met, it is practicable to couple a steplessly variable speed unit, for example a d.c. motor or inverter fed a.c. motor, to a constrainable member, and if such a unit results in a constraint or constraints falling within the speed relationships described herein it is within the scope of the invention.

Alternatives available for braking the constrainable members at zero or substantially zero speed are electrically controlled friction brakes and electric braking by the motor coupled to each constrainable member. The latter is favoured in most applications, requiring d.c. excitation of the motor. An induction motor braked in this way rotates at a creeping speed approximately proportional to the applied torque, with negligible adverse effect compared with other braking in most applications. However synchronous motors or friction brakes are to be preferred where precise inherent limitation of speed change with load is important.

The use of differential assemblies and a.c. motors is not new, although on a relatively small scale. An example having features in common with the present case is due to Raney in U.S. Pat. No. 2,578,837 describing a co-axial assembly in which two three-speed induction motors drive singly or together through a bevel or alternatively spur gear differential to a common output shaft, to give twelve speeds of the output shaft at unequal intervals. In another example by Page in U.S. Pat. No. 2,436,936 a system is disclosed which uses slip power from a main induction motor to drive a subsidiary motor coupled through differential gearing to the main motor. This system is not related to the present invention, in which the motors run directly from the supply, are not interconnected, and do not segregate or use slip power.

The more detailed explanation which follows should be read by reference to the accompanying drawings of which:

Figures 1, 2:
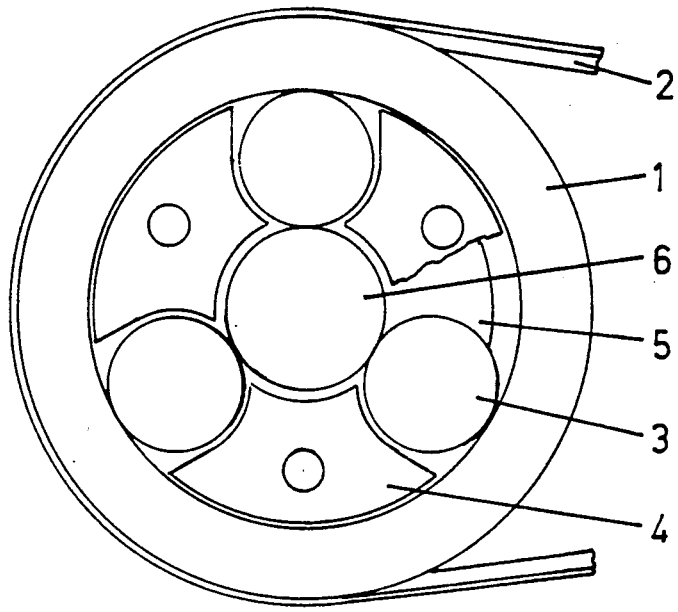
FIG. 1 is a diagrammatic representation of an epicyclic differential assembly.
FIG. 2 is a table of preferred base speed numbers.

FIGS. 5, 7, 9, 11, 13 and 15 illustrates typical end view outlines of the transmissions and motors indicated in FIG. 2, as corresponding to the respective series listed therein; and FIGS. 6, 8, 10, 12, 14 and 16 are plan views corresponding to the end views of FIGS. 5, 7, 9, 11, 13 and 15.

Hitherto epicyclic differential assemblies have employed toothed gearing and their action is well established and understood. A newly developed alternative disclosed in an accompanying specification has construction and characteristics well suited to the uses described herein, being a roller transmission in which cylindrical elements are maintained under pressure in a sealed encasement containing a fluid tractant. The diagram of FIG. 1 enables the operation of either form to be outlined briefly, the circular elements shown being taken either as the pitch diameter of toothed gears, or the diameter of rollers in contact under pressure. The encasement 1 coupled to a motor (not shown) by belt 2 is in contact with rollers 3, rotatable with respect to cage 4 which is an inward extension and part of a shaft assembly 5 connectible externally. Inwardly of rollers 3 is a central shaft 6 also connectible externally. It will be apparent that if encasement 1 is stationary, clockwise rotation of shaft 6 produces clockwise rotation of shaft 5 at a lower speed than shaft 6. Less apparent, but also the case is that if shaft 6 is stationary, clockwise rotation of encasement 1 produces clockwise rotation of shaft 5 at a speed somewhat less than the speed of encasement 1. Maintaining the clockwise rotation of encasement 1 and rotating shaft 6 clockwise also, at the same speed as encasement 1, results in the condition where all three members have the same speed, without relative motion within the differential assembly. Evidently, with encasement 1 at a constant speed, the speed of shaft 5 may be raised or lowered in response to the rotation of shaft 6. Rotation of shaft 5 against an external load results in reaction at encasement 1 and shaft 6, requiring power from the system. If the speed of shaft 5 is reduced by counter-clockwise rotation of shaft 6, encasement 1 continues to draw power from the system, with the reaction at shaft 6 then being in the direction of its rotation, causing the motor coupled to it to regenerate, i.e. to return to the system part of the power drawn by the motor driving encasement 1. This applies generally to those motors switched in a direction reducing the speed of the dependent member.

Figure 3:
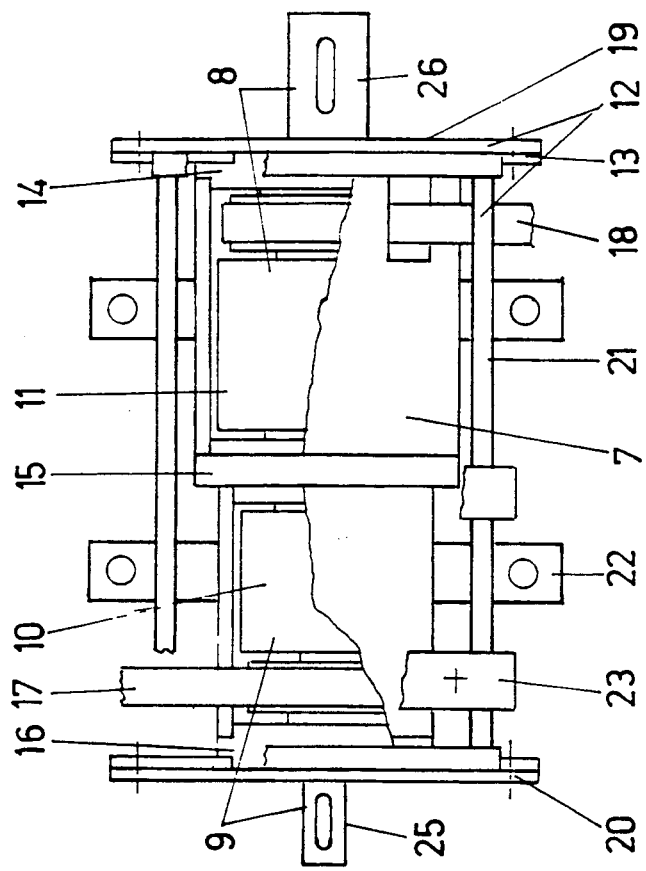
FIG. 3 illustrates a differential transmission in plan, mounted in its frame for coupling to motors.
Figure 4:
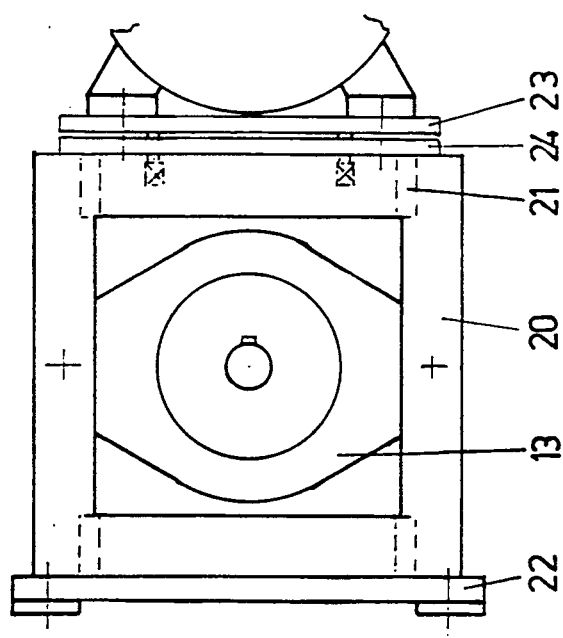
FIG. 4 is an end elevation of the transmission and mounting frame of FIG. 3.
Figure 5:
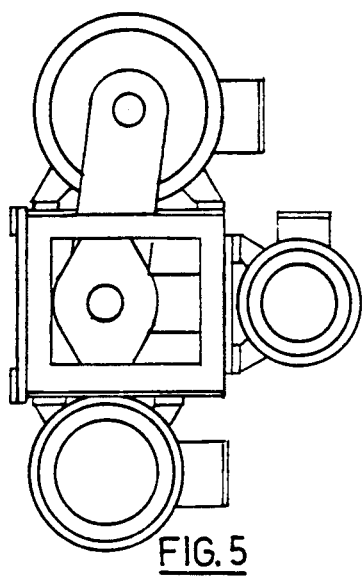
Figure 6:
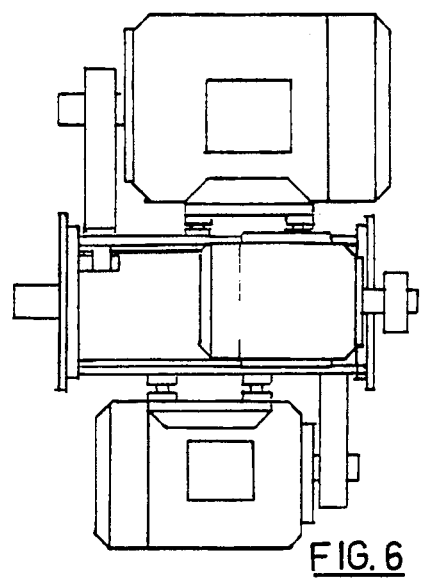
Figure 7:
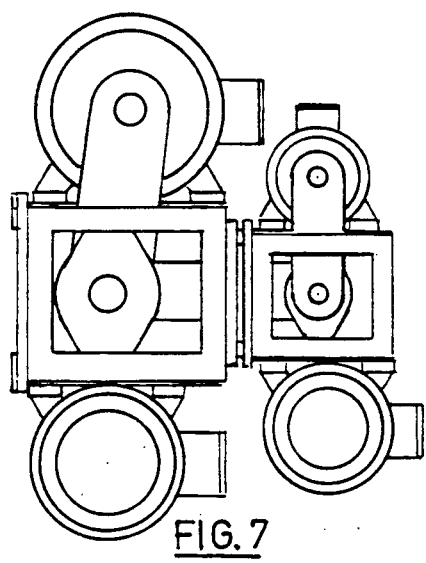
Figure 8:
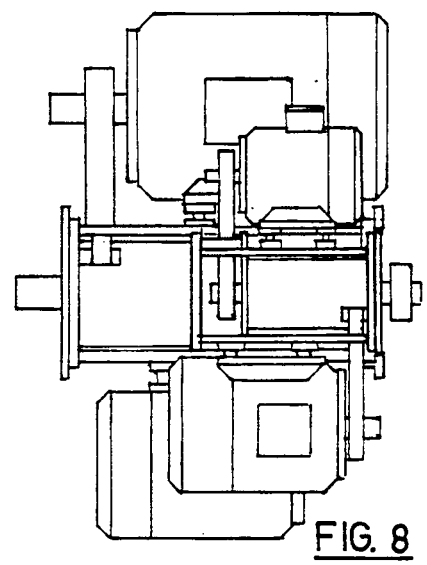
Figure 9:
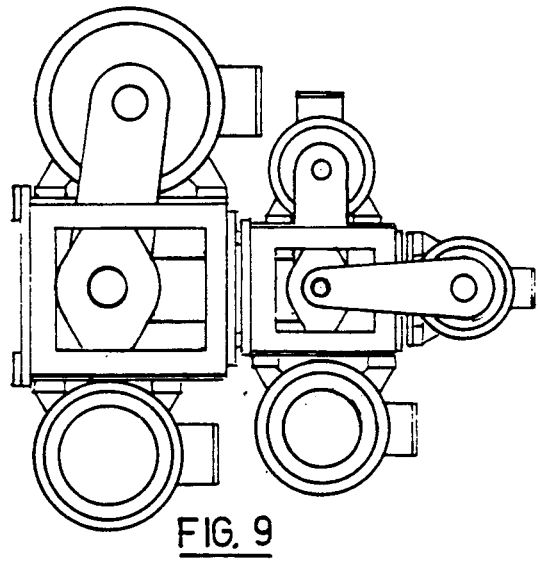
Figure 10:
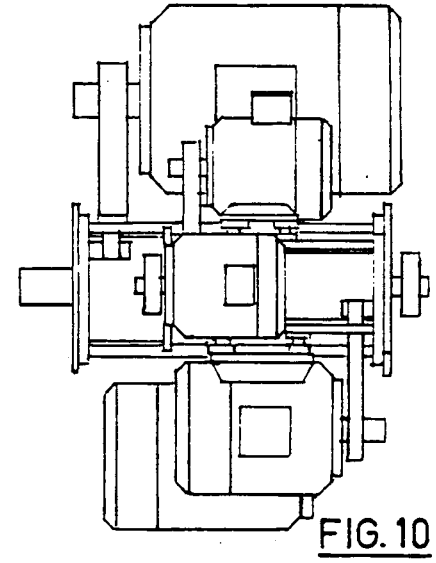
Figure 11:
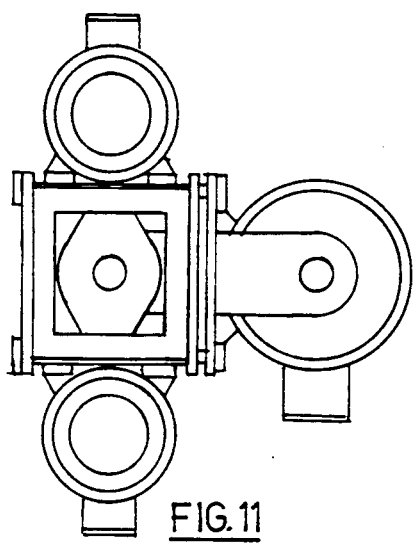
Figure 12:
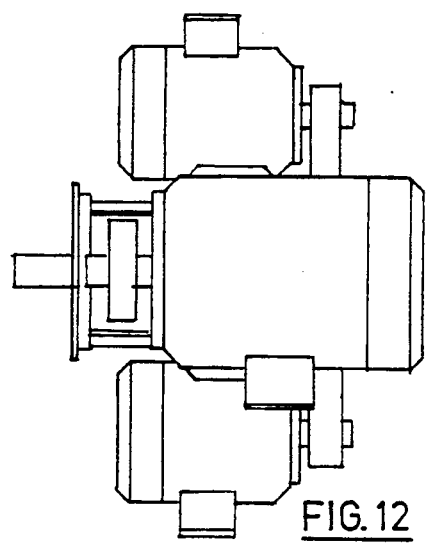
Figure 13:
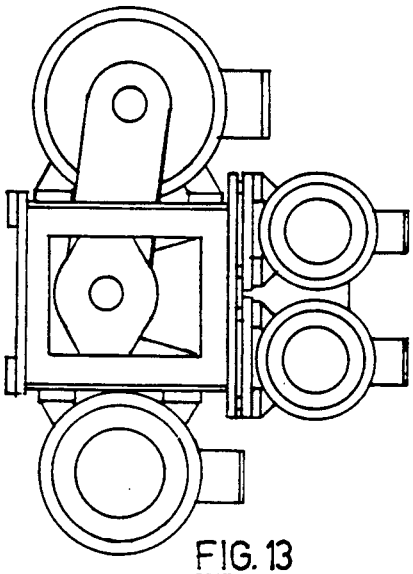
Figure 14:
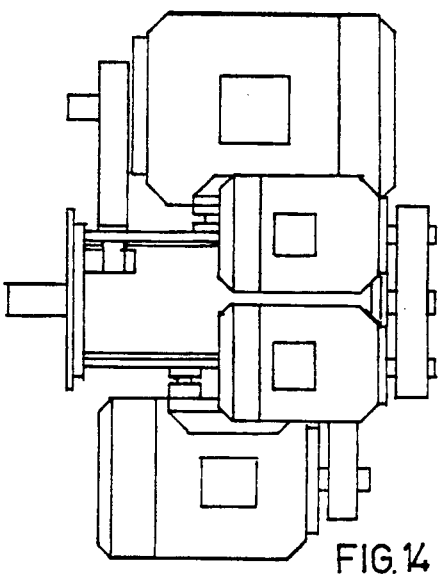
Figure 15:
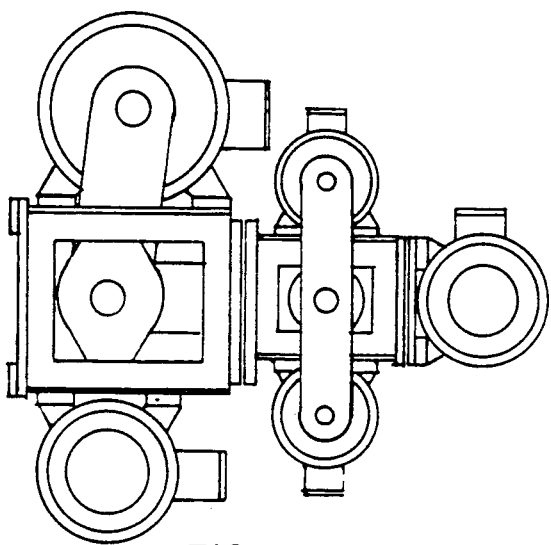
Figure 16:
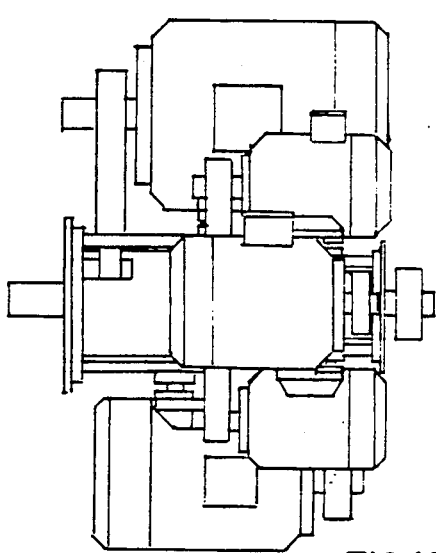

There are numerous alternatives for the arrangement of the differential assemblies and motors, from building them into driven equipment, to a separate free-standing unit to be coupled in one or other of the conventional ways. FIG. 3 and FIG. 4 are indicative of one such arrangement. Referring to these figures a differential transmission in housing 7 comprises a differential assembly 8 coupled in line to a differential assembly 9 by a shaft extending from encasement 10 of differential assembly 9 into encasement 11 of differential assembly 8. The transmission housing 7 is mounted in a frame 12 by mounting plates 13, and has bearing plates 14,15,16 in which are carried the bearings supporting independently rotatable encasements 10,11 each with a driving pulley over which pass belts 17,18 respectively. Frame 12 has end supports 19, 20 to which mounting plates 13 are secured, and longitudinal rails 21 extending between end supports 19,20, removably secured thereto at one end at least to permit assembly of the transmission in the frame. Longitudinal rails 21 are of substantial section to carry bars for mounting the motors driving the members of the transmission. Bars 22 are secured transversely below the frame if required for foot mounting of the drive. Where provision for belt tension is necessary the transverse motor mounting bars 23 may be bolted to the motor feet, with jackscrews, preferably three in number, passing through corresponding bars 24 on the frame. Similar bars may be attached to longitudinal rails 21 for the motors mounted at the sides of frame 12.

The number of transmitting members of the differential assemblies 8, 9 in FIG. 3 and FIG. 4 is four i.e. two in excess of the number of assemblies, as previously noted. For speeds in the usual industrial range the shaft or alternatively the encasement of the differential assembly having the highest torque capability is clearly the choice as the dependent member, the shaft generally being preferred because it leaves open all options for the manner of connection to the driven equipment. The constrainable members, in order of the base speeds attributable to them, are shaft 25, encasement 10, encasement 11, and the dependent member is shaft 26, with the speed ratio between each constrainable member and shaft 26 decreasing in the same order.

FIG. 2 is a listing of preferred base speed numbers providing speed series in accordance with this invention. The use of speed numbers as distinct from actual speeds greatly simplifies both the listing of speed series and preparation of switching sequences, as well as facilitating reference to those drives having a common arrangement of differentials and motors, but differing powers and speed ranges. The constrainable members numbered in the table are in ascending order of the base speed(s) attributable to each. Numbers separated by a colon are alternative terminating base speed numbers for the series in which they appear, with similarly separated corresponding numbers in the column for total speeds. Where two or more numbers are shown at a constrainable member elsewhere they indicate a base speed corresponding to each, and they must be at an interval or intervals equal to the interval of the first at that member from zero. Excluding the lower terminating number where there are two, the table is compiled on the simple basis that the base speed, or where there is more than one, the lower or lowest at each constrainable member taken in order, is $(2n+1)$ times the sole, lower, or lowest at the immediately preceding constrainable member, 'n' being the number of base speeds at that preceding member.

The lower terminating number, where listed, exceeds by one the sum of the sole, higher, or highest, as the case may be, of the base speed numbers at all the preceding constrainable members in the particular series. More than one base speed at the highest numbered constrainable member in a series excludes the lower terminating number, as may be noted from series 10 and series 13.

The number of constrainable members is the same as the number of columns occupied by the series, excluding the column of total speed numbers, and the number of differential assemblies is less by one.

To illustrate the compilation table (FIG. 2), reference may be made to Series 4 as an example. Here, the column for the first constrainable member shows two base speed numbers viz. 1 and 2. As already noted, when two or more base speed numbers are shown in a constrainable member column, the interval from zero to the lower, in this case 1, shall be the same between the lower and the next, again 1. With two base speed numbers in the column of this member, the value "n" is 2, and $2n+1=5$ by which the lower base speed number at the first constrainable member is multiplied to give the sole, lower, or lowest base speed number, as the case may be, at the second constrainable member, i.e., 5. For the third constrainable member, with $n=1$ at the second, $2n+1=3$, thus giving $5\times 3=15$, being the higher terminating base speed number of the series. The lower terminating number at the same member is 8, obtained as one more than the sum of the higher or sole base speed numbers, as the case may be, at all the preceding constrainable members, viz. $2+5+1$. It may be noted in passing that had there been two base speeds at the second constrainable member, where the interval from zero to the lower is 5, this same interval would give 10 for the second base speed number as in Series 7.

The column headed "Total Speeds" gives the number of distinct speeds of the dependent member for the series; it is the sum of the sole, higher, or highest, as the case may be of the base speed numbers at all the constrainable members, including one only of the alternative terminating base speed numbers, viz. for Series 4.

| | |
|---|---|
| $2+5+8=15$ | i.e., 15:22 |
| $2+5+15=22$ | | operating modes and switching sequence for this series, four in number, follow later.

The numerical relationship of the base speeds determined as described provides in each series successive advance of speed of the dependent member in increments equal to the smallest base speed, to the total in the last column of the table.

For speed range from zero to maximum the actual speeds are obtained by using a multiplier, uniform throughout each series, equal to the maximum speed divided by the total number of speeds. For the very numerous other cases, with a minimum other than zero, the lower terminating base speed is placed at equal intervals from the minimum and maximum speeds, the multiplier being given by dividing the speed range by one less than the number of speeds, the actual speed being speed number times multiplier added to or subtracted from the terminating base speed.

The series with the higher terminating base speed number are unsuitable for a zero to maximum speed range with the highest numbered constrainable member running continuously, and for ranges other than zero to maximum.

Quite evidently other and more extended series than listed in FIG. 2 can be compiled if required. Also series compiled in other ways will result in full or partial successions of dependent member speeds at equal intervals, in some cases including redundant speeds. While within the scope of the invention they are likely to be less effective in terms of the number of speeds relative to the number of rotational constraints than the preferred series.

The apportionment of power input between constrainable members may be determined from the base speed attributable to each the most common requirement being for constant torque over the range, i.e. power in proportion to speed. The nominal power for each base speed is accordingly rated power of drive divided by maximum speed and multiplied by base speed. A margin over nominal power may be necessary for frequent switching, and for sustained electric braking of motors.

It is practicable to arrange the power distribution to give a stepped torque grading over the speed range, subject to meeting the maximum torque imposed at each constrainable member.

In series with the lower of the terminating base speed numbers in FIG. 2, the power requirement of the largest motor for a speed range from zero to maximum is little more than half the total; in one of the alternative switching sequences for these series the largest motor runs continuously while the drive is energized i.e. is not switched to change speed and braking is not required at the member it drives.

The series with the higher terminating base speed number have a power requirement at the largest motor about two thirds the total, and more speeds for a given number of constrainable members, but are less suited to frequent speed transition at about one third, of maximum speed, which requires simultaneous switching of all the motors.

Working from FIG. 2, it is straightforward to establish the switching sequences for the various operating modes in which the drives can be used, and to set out each series in full, from which any speed therein may be selected.

Continuing with examples using Series 4 of FIG. 2, the operating modes available and corresponding switching sequences are set out below, applying to all the series in FIG. 2, with the exception of Series 10 and Series 13, for each of which only one mode of the four is available, as identified in the first example, speeds are those of the dependent member, the maximum speeds being used at random. Within limits imposed by motors and the practicable transmission ratios, choice of speed range is unrestricted.

In the examples:
1) The number(s) above each actual speed are the base speed numbers to be energized to give that speed,
2) for each speed, the direction of rotation depends on that of the highest base speed energized, a plus sign being for the same direction, and a minus signal for the reverse direction,
3) at a speed where no base speed number attributable to a particular constrainable member appears, that member is braked.

(a) Higher terminating base speed switched : zero to maximum range.

| | | | | |
|---|---|---|---|---|
| Maximum speed | 1,500 RPM | | | |
| Total speeds in series | 22 | | | |
| Lowest base speed | 1,500/22 = 68 RPM | | | |
| Base speed numbers (from FIG. 2) | 1 & | 2, | 5, | 15 |
| Base speeds | 68, | 136, | 341, | 1023 |
| Switching sequence | 1, | 2, | 5 − 2, | 5 − 1, | 5 |
| Actual speed, RPM | 68, | 136, | 205, | 273, | 341, |
| (continued) | 5 + 1, | 5 + 2, | 15 − 5 − 2, | 15 − 5 − 1, |
| | 409, | 477, | 546, | 614, |
| (continued) | 15 − 5, | 15 − 5 + 1, | 15 − 5 + 2, | 15 − 2, |
| | 682, | 750, | 818, | 886, |
| (continued) | 15 − 1, | 15, | 15 + 1, | 15 + 2, |
| | 954, | 1023, | 1091, | 1159, |
| (continued) | 15 + 5 − 2, | 15 + 5 − 1, | 15 + 5, |
| | 1228, | 1296, | 1364, |
| (continued) | 15 + 5 + 1, | 15 + 5 + 2 |
| | 1432, | 1500. |

This operating mode is usuable for all the series listed in FIG. 2.

(b) Lower terminating base speed switched : zero to maximum range.

| | | | | | |
|---|---|---|---|---|---|
| Maximum speed | 1,500 RPM | | | | |
| Total speeds in series | 15 | | | | |
| Lowest base speed | 1,500/15 = 100 RPM | | | | |
| Base speed numbers | 1 & | 2, | 5, | 8 | |
| Base speeds, RPM | 100 & | 200, | 500, | 800 | |
| Switching sequence | 1, | 2, | 5 − 2, | 5 − 1, | 5 |
| Actual speed, RPM | 100, | 200, | 300, | 400, | 500 |
| (continued) | 5 + 1, | 5 + 2, | 8, | 8 + 1, | 8 + 2, | 8 + 5 − 2 |
| | 600, | 700, | 800, | 900, | 1000, | 1100, |
| (continued) | 8 + 5 − 1, | 8 + 5, | 8 + 5 + 1, | 8 + 5 + 2 |
| | 1200, | 1300, | 1400, | 1500. |

(c) Lower terminating base speed running continuously: zero to maximum range.

| | | | | | |
|---|---|---|---|---|---|
| Maximum speed | 1,500 RPM | | | | |
| Total speeds in series | 15 | | | | |
| Lowest base speed | 1,500/15 = RPM | | | | |
| Base speed numbers | 1 & | 2, | 5, | 8 | |
| Base speed, RPM | 100 & | 200, | 500, | 800 | |
| Switching sequence | 8 − 5 − 2, | 8 − 5 − 1, | 8 − 5, | 8 − 5 + 1, | |
| Actual speed, RPM | 100, | 200, | 300, | 400, | |
| (continued) | 8 − 5 + 2, | 8 − 2, | 8 − 1, | 8, | 8 + 1, | 8 + 2, |
| | 500, | 600, | 700, | 800, | 900, | 1000, |
| (continued) | 8 + 5 − 2, | 8 + 5 − 1, | 8 + 5, | 8 + 5 + 1, | 8 + 5 + 2, |
| | 1100, | 1200, | 1300, | 1400, | 1500 |

(d) Lower terminating base speed running continuously : minimum to maximum range.

| Speed range - Minimum 800 RPM, Maximum 1,500 RPM | | | | | |
|---|---|---|---|---|---|
| Total speeds in series | 15 | | | | |
| Lowest base speed | (1500 − 800)/(15 − 1) = 50 RPM | | | | |
| Highest base speed | 800 + (1500 − 800)/2 = 1150 RPM | | | | |
| Base speed numbers | 1 & | 2, | 5, | 8 | |
| Base speed, RPM | 50 & | 100, | 250, | 1150 | |
| Switching sequence | 8 − 5 − 2, | 8 − 5 − 1, | 8 − 5, | 8 − 5 + 1 | |
| Actual speed, RPM | 800, | 850, | 900, | 950, | |
| (continued) | 8 − 5 + 2, | 8 − 2, | 8 − 1, | 8, | 8 + 1, | 8 + 2 |
| | 1000, | 1050, | 1100, | 1150, | 1200, | 1250 |
| (continued) | 8 + 5 − 2, | 8 + 5 − 1, | 8 + 5, | 8 + 5 + 1, | 8 + 5 + 2 |
| | 1300, | 1350, | 1400, | 1450, | 1500. |

Where there are two base speeds at a constrainable member, suitable two speed induction motors are available commercially. For three speeds a single induction motor is practicable, but unlikely to be economic, the alternative being to use a two-speed and a single speed motor as shown in outlines FIGS. 11 through 16. Two or three speeds at a member are best limited to the lower numbered members in consideration of cost. By way of illustration if the two speeds at member 1 of series 8 in FIG. 2 are transferred to member 3 the base speeds will be 1, 3 & 6, 15 & 30, 38:75 Total 75:112 with appreciably higher cost by reason of the higher power of the motor at member 3 compared with member 1 in the preferred series.

A drive may be arranged with a member held at zero speed e.g. for torque indication or control, that member not then being regarded as a constrainable member.

While it is practicable, by reason of the compactness of the differential assemblies to mount them within motors and thereby to obtain a complete directly coupled drive, such an arrangement precludes use of standard motors, is more limited in the available speed ranges and more difficult to maintain.

This specification refers throughout to drives powered electrically providing mechanical output. The drives described are equally suitable for speed changing when the power flow is reversed, i.e. mechanical power input at what has been described as the dependent member, with electrical power output to the supply system.

I claim:

1. A rotary drive employing at least one epicyclic differential assembly to which another or others may be coupled directly or indirectly, functioning as a transmission having a plurality of externally connectible transmitting members two greater in number than the number of differential assemblies, the totality less one of said members each being constrainable at zero or substantially zero speed by braking, and at least at one rotational speed by coupling to reversible and regenerative rotative electric means capable of maintaining constant or substantially constant speed, the speed of the one transmitting member not so constrainable being dependent on the speed or speeds of the said constrainable members, operable singly or severally, the speed or speeds at which each said member is constrainable and the speed ratio between the said member and the dependent member together determining a base speed of the dependent member for each and every rotational speed of each said constrainable member with all other constrainable members at zero speed, the base speeds of the dependent member being at least three in number and of value such that the available combinations of the base speeds provide a series of speeds each at a substantially equal interval from the next, obtainable by selectively applied constraint of the said constrainable members.

2. A rotary drive as set forth in claim 1 wherein the relationship of the base speeds one to another is determined by the number thereof attributable to the respective constrainable members taken in ascending order of the base speeds, with the lowest base speed attributable to the first constrainable member, and of value equal to the maximum speed of the drive divided by the number of speeds in the said series, the sole, lower, or lowest as the case may be attributable to each constrainable member after the first being a multiple of the sole, lower, or lowest attributable to the immediately preceding constrainable member, the multiplier exceeding by one twice the number of base speeds attributable to said immediately preceding constrainable member, and where more than one base speed is attributable to any one constrainable member the intervals between the last mentioned base speeds being equal to the interval of the lower or lowest thereof from zero, thereby to provide a series of speeds at substantially equal intervals from zero speed to the maximum speed.

3. A rotary drive as set forth in claim 1 wherein the relationship of the base speeds one to another excluding the highest is determined by the number thereof attributable to the respective constrainable members taken in ascending order of the base speeds, with the lowest base speed attributable to the first constrainable member, and of value equal to the maximum speed of the drive divided by the number of speeds in the said series, the sole, lower, or lowest as the case may be attributable to each constrainable member after the first and excluding the highest being a multiple of the sole, lower, or lowest attributable to the immediately preceding constrainable member, the multiplier exceeding by one twice the number of base speeds attributable to said immediately preceding constrainable member, and where more than one base speed is attributable to any one constrainable member the intervals between the last mentioned base speeds being equal to the interval of the lower or lowest thereof from zero, with the highest base speed being determined as the sum of the sole, higher, or highest base speed as the case may be attributable to each and every constrainable member preceding the constrainable member to which the highest base speed is attributable, the said sum additionally including the lowest base speed, there being one base speed only attributable to the last mentioned constrainable member, the base speeds so determined providing a series of speeds at substantially equal intervals from zero speed to the maximum speed.

4. A rotary drive as set forth in claim 1 wherein the said rotational speed constraint at a constrainable member is applied by reversible and regenerative constant or substantially constant speed alternating current electric machine.

5. A rotary drive as set forth in claim 1 wherein rotational speed constraint applied to a constrainable member by reversible and regenerative steplessly variable speed means is capable of providing at least one base speed consistent with the relationship one to another of the base speeds of the drive of which it is a part there being at least two of the said base speeds attributable to other rotational speed constraints.

6. A rotary drive as set forth in claim 1 wherein at least one said differential assembly is of the form wherein torque is transmitted by cylindrical rolling elements which are maintained in rolling contact by surrounding rings with angled surfaces and coils, which lie in a continuous helical path, the combination of the rings and helical coils provide an effective cylindrical inner surface of a diameter determined by the diameters of the cylindrical elements within it, axial pressure when exerted on the rings is redirected inwardly by the angled surfaces of the rings to cause the helical coils to contrast radially onto the cylindrical elements, exerting pressure at the lines of rolling contact.

7. A rotary drive employing at least one epicyclic differential assembly, to which another or others may be coupled directly or indirectly, functioning as a transmission having a plurality of externally connectible transmitting members two greater in number than the number of differential assemblies, the totality less two of said members each being constrainable at zero or substantially zero speed by braking, with the totality less one each being constrainable at least at one rotational speed by coupling to reversible and regenerative rotative electric means capable of maintaining constant or substantially constant speed, the speed of the one transmitting member not so constrainable being dependent on the speed or speeds of the said constrainable members, with the unbraked constrainable member running continuously while the drive is energized and the remainder operable singly or severally, the speed or speeds at which each said member including the unbraked member is constrainable and the speed ratio between each said member and the dependent member together determining a base speed of the dependent member for each and every rotational speed of each said constrainable member with all other constrainable members at zero speed, the highest base speed being attributable to the unbraked constrainable member, the base speeds of the dependent member being at least three in number and of value such that the available combinations of the base speeds provide a series of speeds each at a substantially equal interval from the next obtainable by selectively applied constraint of the said constrainable members excluding the unbraked constrainable member.

8. A rotary drive as set forth in claim 7 wherein the relationship of the base speeds one to another excluding the highest is determined by the number thereof attributable to the respective constrainable members taken in ascending order of the base speeds, with the lowest base speed attributable to the first constrainable member, and of value equal to the maximum speed of the drive divided by the number of speeds in the said series, the sole, lower, or lowest as the case may be attributable to each constrainable member after the first and excluding the highest being a multiple of the sole, lower, or lowest attributable to the immediately preceding constrainable member, the multiplier exceeding by one twice the number of base speeds attributable to said immediately preceding constrainable member, and where more than one base speed is attributable to any one constrainable member the intervals between the last mentioned base speeds being equal to the interval of the lower or lowest thereof from zero, with the highest base speed being determined as the sum of the sole, higher, or highest base speed as the case may be attributable to each and every constrainable member preceding the constrainable member to which the highest base speed is attributable, the said sum additionally including the lowest base speed, there being one base speed only attributable to the last mentioned constrainable member, the base speeds so determined providing a series of speeds at substantially equal intervals from zero speed to the maximum speed.

9. A rotary drive as set forth in claim 7 wherein the said series of speeds extends from a minimum speed other than zero to a maximum speed, and has its highest base speed placed between said minimum and maximum speeds equally from each, the relationship of the base speeds one to another excluding the highest base speed being determined by the number thereof attributable to the respective constrainable members taken in ascending order of the base speeds, with the lowest base speed attributable to the first constrainable member, and of value equal to the difference between said minimum and maximum speeds divided by one less than the number of speeds in the series, the sole, lower, or lowest as the case may be attributable to each constrainable member after the first and excluding the highest being a multiple of the sole, lower, or lowest attributable to the immediately preceding constrainable member, the multiplier exceeding by one twice the number of base speeds attributable to said immediately preceding constrainable member, and where more than one base speed is attributable to any one constrainable member the intervals between the last mentioned base speeds being equal to the interval of the lower or lowest thereof from zero, there being one base speed only attributable to the constrainable member to which the highest base speed is attributable, the base speeds so determined providing a series of speeds at substantially equal intervals between the said minimum and maximum speeds.

10. A rotary drive as set forth in claim 7 wherein the said rotational speed constraint at a constrainable member is applied by reversible and regenerative constant or substantially constant speed alternating current electric machine.

11. A rotary drive as set forth in claim 7 wherein rotational speed constraint applied to a constrainable member by reversible and regenerative steplessly variable speed means is capable of providing at least one base speed consistent with the relationship one to another of the base speeds of the drive of which it is a part there being at least two of the said base speeds attributable to other rotational speed constraints.

12. A rotary drive as set forth in claim 7 wherein at least one said differential assembly is of the form wherein torque is transmitted by cylindrical rolling elements which are maintained in rolling contact by surrounding rings with angled surfaces and coils, which lie in a continuous helical path, the combination of the rings and helical coils providing an effective cylindrical inner surface of a diameter determined by the diameters of the cylindrical elements within it, axial pressure when exerted on the rings is redirected inwardly by the angled surfaces of the rings to cause the helical coils to contract radially onto the cylindrical elements, exerting pressure at the lines of rolling contact.

* * * * *